(12) United States Patent
Isaji

(10) Patent No.: US 10,570,941 B2
(45) Date of Patent: Feb. 25, 2020

(54) CLIP

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

(72) Inventor: Yusuke Isaji, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 16/358,957

(22) Filed: Mar. 20, 2019

(65) Prior Publication Data

US 2019/0293103 A1    Sep. 26, 2019

(30) Foreign Application Priority Data

Mar. 23, 2018 (JP) .................................. 2018-055951

(51) Int. Cl.
*F16B 7/04* (2006.01)
*B60R 16/02* (2006.01)

(52) U.S. Cl.
CPC .......... *F16B 7/048* (2013.01); *B60R 16/0215* (2013.01)

(58) Field of Classification Search
CPC combination set(s) only.
See application file for complete search history.

(56) References Cited

U.S. PATENT DOCUMENTS

| 3,632,071 | A | * | 1/1972 | Cameron | F16L 3/08 248/74.3 |
|---|---|---|---|---|---|
| 5,337,983 | A | * | 8/1994 | Mailey | F16L 3/137 248/68.1 |
| 5,730,399 | A | * | 3/1998 | Baginski | H02G 3/263 24/16 PB |
| 6,533,226 | B2 | * | 3/2003 | Geiger | F16L 3/233 248/68.1 |
| 9,004,417 | B2 | * | 4/2015 | Elsner | B60R 16/0215 24/115 A |
| 9,067,717 | B2 | * | 6/2015 | DeMik | B65D 67/02 |
| 9,718,591 | B2 | * | 8/2017 | Lu | B65D 63/1027 |
| 10,148,075 | B2 | * | 12/2018 | Loewe | H02G 3/32 |
| 2017/0106816 | A1 | | 4/2017 | Wakabayashi et al. | |
| 2018/0118136 | A1 | * | 5/2018 | Carremm | F16L 3/26 |

* cited by examiner

*Primary Examiner* — Monica E Millner
(74) *Attorney, Agent, or Firm* — Honigman LLP

(57) ABSTRACT

Provided is a clip to be attached to a vehicle body panel having panel surfaces that intersect each other, while separately holding different wire groups in a state of being near each other. The clip disclosed in the present specification includes a first wire holding portion for holding a first wire group; a second wire holding portion for holding a second wire group; a vehicle body attachment portion to be attached to the vehicle body; and a coupling portion for coupling the first wire holding portion and the second wire holding portion. The coupling portion includes a first coupling portion that is continuous with the first wire holding portion and a second coupling portion that is continuous with the second wire holding portion. The first coupling portion and the second coupling portion intersect each other.

8 Claims, 9 Drawing Sheets

CLIP

CROSS-REFERENCE TO RELATED APPLICATIONS

This application claims priority of Japanese Patent Application No. JP 2018-055951 filed Mar. 23, 2018, the contents of which are incorporated herein.

TECHNICAL FIELD

The technique disclosed by the present specification relates to a clip that is to be attached to a vehicle body and can hold a wire group.

BACKGROUND

A band clip according to JP 2017-77082A has been known as an example of a conventional clip. This band clip includes: a bundling band portion that bundles a wire group; and a clip portion that is provided integrally on the head of the bundling band portion and is locked in a through hole of a vehicle body panel.

DISCLOSURE

For example, in a case in which different wire groups, such as a low-voltage wire group and a high-voltage wire group, are routed near each other, when the wire groups are held with separate clips and the clips are attached to the vehicle body panel, there is a risk that the leading ends of the clip portions will interfere with each other. In particular, when the vehicle body panel has panel surfaces that intersect each other and the clips are attached to the panel surfaces, there is a risk that the leading ends of the clip portions will interfere with each other.

The technique disclosed in the present specification has been completed based on the foregoing circumstance, and aims to provide a clip according to which two wire groups can be attached to panel surfaces that intersect each other, while separately holding the two wire groups.

SUMMARY

The clip disclosed in the present specification is a clip that is to be attached to a vehicle body and is for holding a wire group, including: a first wire holding portion for holding a first wire group; a second wire holding portion for holding a second wire group; a vehicle body attachment portion to be attached to the vehicle body; and a coupling portion for coupling the first wire holding portion and the second wire holding portion. The coupling portion includes a first coupling portion that is continuous with the first wire holding portion and a second coupling portion that is continuous with the second wire holding portion, and the first coupling portion and the second coupling portion intersect each other.

The first coupling portion and the second coupling portion intersect each other, and therefore, for example, if the vehicle body panel includes two panel surfaces that intersect each other, the clips can be attached to the vehicle body such that the first coupling portion and the second coupling portion are parallel to the panel surfaces of the vehicle body panel. Accordingly, the first wire group and the second wire group are routed along the respective panel surfaces, and therefore the first wire group and the second wire group can be routed even in a location with little routing space.

Also, since there is one attachment portion of a vehicle body-side clip for the two wire holding portions (first wire holding portion and second wire holding portion), the number of attachment portions of the vehicle body-side clip can be reduced.

Also, the first coupling portion and the second coupling portion intersect each other, and therefore, for example, when performing a task of holding the first wire group in the first wire holding portion, the hand is less likely to come into contact with the second wire holding portion, and therefore workability is improved.

It is also possible to use a configuration in which a surface of the first coupling portion that is continuous with the first wire holding portion, and a surface of the second coupling portion that is continuous with the second wire holding portion intersect each other.

For example, if the vehicle body panel has two panel surfaces that intersect each other, the first wire group and the second wire group can be reliably routed along each panel surface by attaching the clip to the vehicle body panel such that the surface opposite to the surface continuous with the first wire holding portion of the first coupling portion and the surface opposite to the surface continuous with the second wire holding portion of the second coupling portion are parallel with the respective panel surfaces of the vehicle body panel.

It is also possible to use a configuration in which the first coupling portion and the second coupling portion are orthogonal to each other.

The clip can be attached to the two panel surfaces intersecting each other, such that the first coupling portion and the second coupling portion are parallel with the respective panel surfaces of the vehicle body panel.

It is also possible to use a configuration in which the vehicle body attachment portion is arranged on a surface of the first coupling portion on the side opposite to the first wire holding portion.

Due to the vehicle body attachment portion being arranged as described above, in the case of a configuration in which, for example, the vehicle body attachment portion is attached by being pressed into the attachment hole of the vehicle body panel, the clip can be attached to the vehicle body by holding the first wire holding portion with a hand and pressing it into the attachment hole of the vehicle body panel.

It is also possible to use a configuration in which the vehicle body attachment portion includes: a locking portion that is continuous with the coupling portion; and a lock receiving portion that is separate from the locking portion, is to be attached to the vehicle body, and is to be locked with the locking portion.

Due to the locking portion and the lock receiving portion being locked, the clip can be attached to the vehicle body.

It is also possible to use a configuration in which the first wire holding portion includes a first band portion for bundling and holding the first wire group, and the second wire holding portion includes a second band portion for bundling and holding the second wire group.

The first coupling portion and the second coupling portion intersect each other, and therefore, for example, when performing a task of bundling the first wire group in the first band portion, a finger of a worker or the first band portion is prevented from interfering with the second wire holding portion and the second wire group.

Advantageous Effects of Disclosure

According to the clip described in the present specification, different wire groups can be held separately in a state of being near each other, and can be attached to a vehicle body panel having panel surfaces that intersect each other.

DETAILED DESCRIPTION OF PREFERRED EMBODIMENTS

A clip 10 of Embodiment 1 will be described with reference to FIGS. 1 to 4. In the following description, the X direction in FIGS. 1 to 4 is set as forward, the Y direction is set as rightward, and the Z direction is set as upward.

Figure 1:
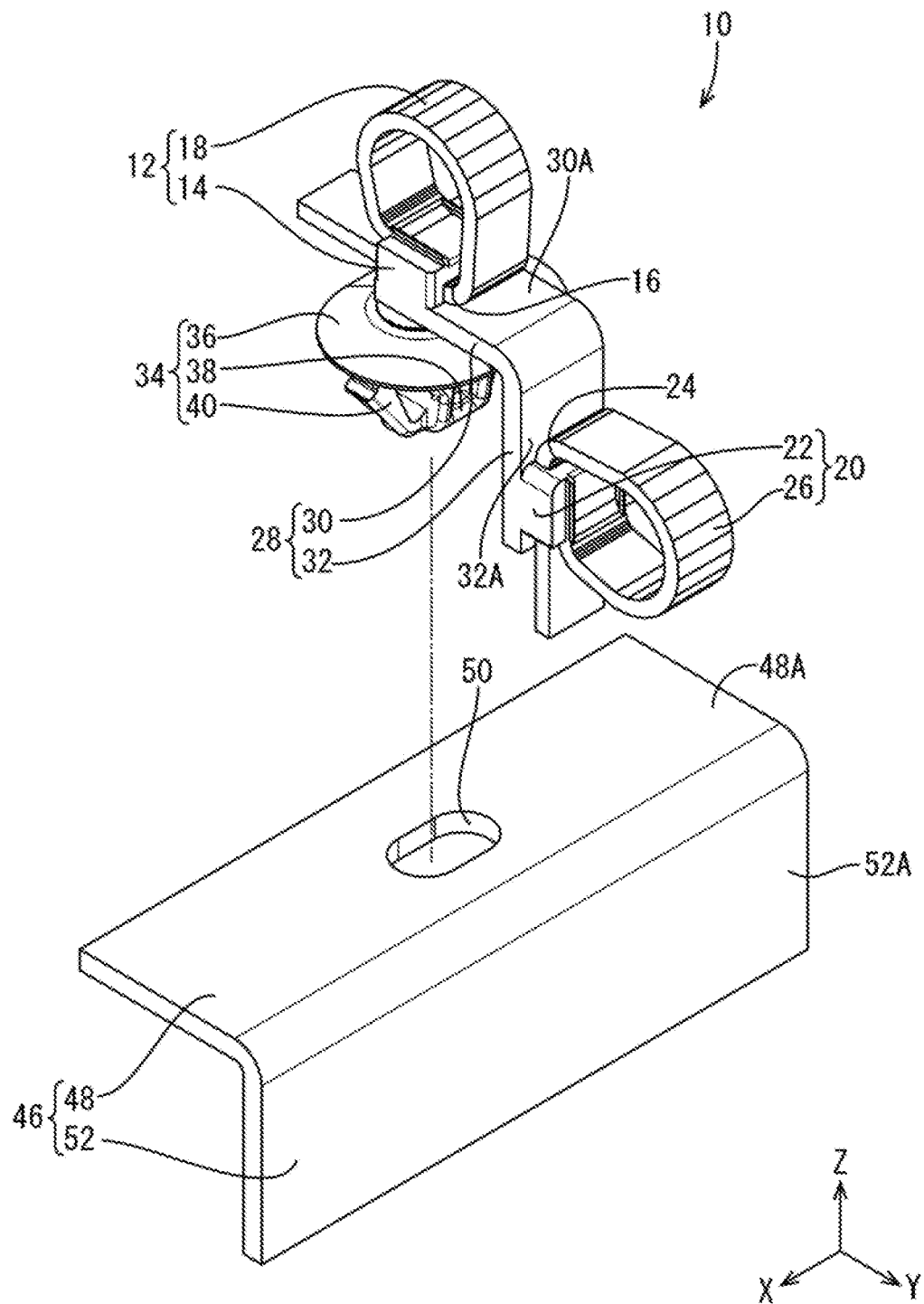
FIG. 1 is a perspective view of a clip of Embodiment 1 before being attached to a vehicle body panel.
Figure 2:
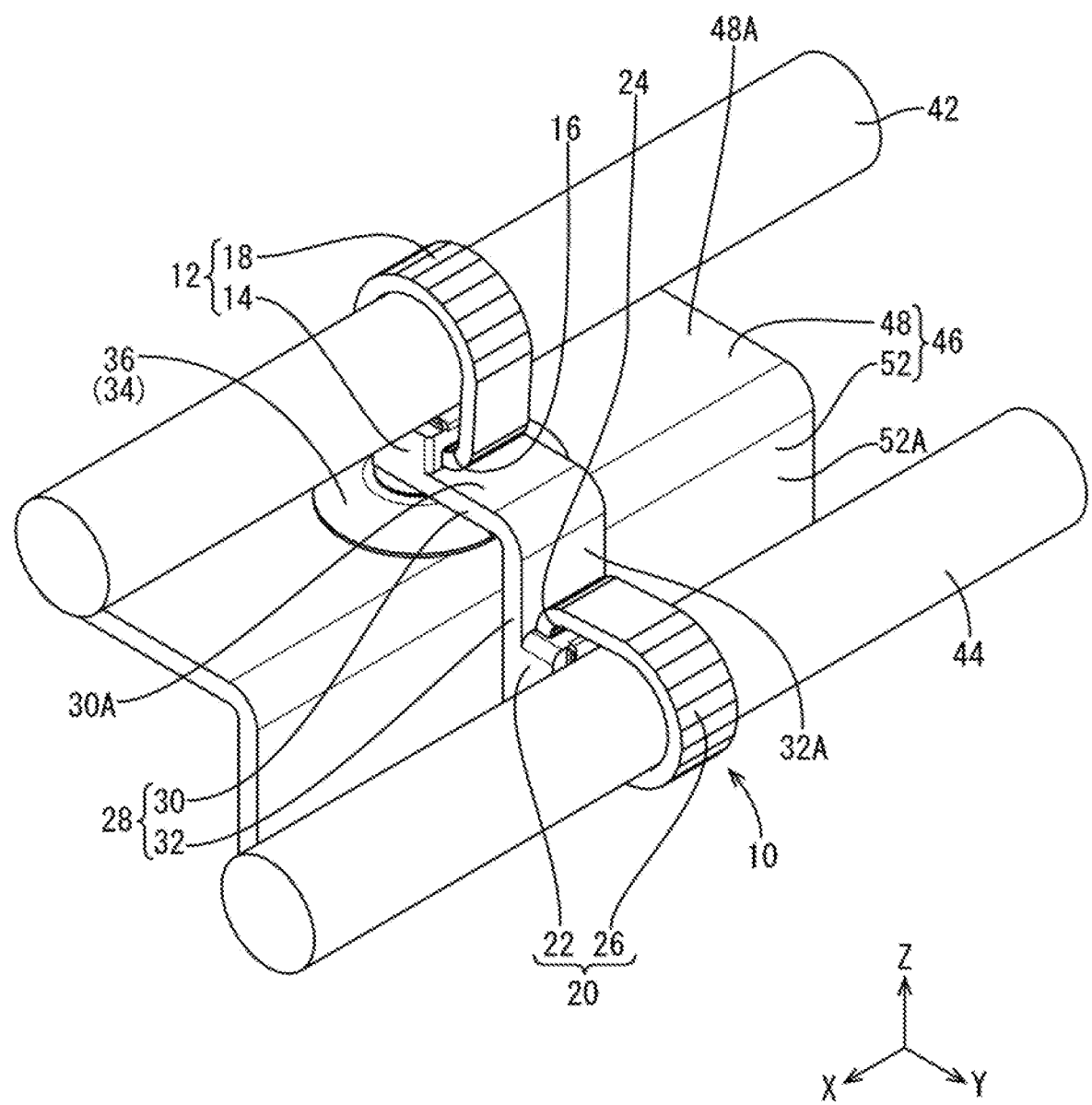
FIG. 2 is a perspective view of the clip after being attached to the vehicle body panel.

As shown in FIGS. 1 and 2, the clip 10 of the present embodiment is a band clip that is to be attached to a vehicle body panel 46 having an L-shaped plate shape, and is to hold two wire groups. The vehicle body panel 46 is constituted by a first panel portion 48 having a shape that is long in the front-rear direction, and a second panel portion 52 that protrudes downward from the right end of the first panel portion 48. The clip 10 is attached to the first panel portion 48, and an attachment hole 50 with an elongated hole shape that is elongated in the front-rear direction is provided open on the first panel portion 48. An upper surface 48A of the first panel portion 48 and a right surface 52A of the second panel portion 52 are orthogonal to and intersect each other.

As shown in FIG. 1, the clip 10 includes: a first wire holding portion 12; a second wire holding portion 20; a coupling portion 28 coupling the first wire holding portion 12 and the second wire holding portion 20; and a vehicle body attachment portion 34. As shown in FIG. 2, a first wire group 42 constituted by multiple low-voltage wires is held in the first wire holding portion 12, and a second wire group 44 constituted by multiple high-voltage wires is held in the second wire holding portion 20. In this manner, the clip 10 of the present embodiment is used when the two wire groups, which cannot be consolidated, are routed in parallel with the vehicle body panel 46 and with the wire groups near each other, as with the low-voltage wire group 42 and the high-voltage wire group 44. Note that a covering material (e.g., a corrugated tube) is attached to the first wire group 42 and the second wire group 44, although this is not shown in the drawing.

Figure 3:
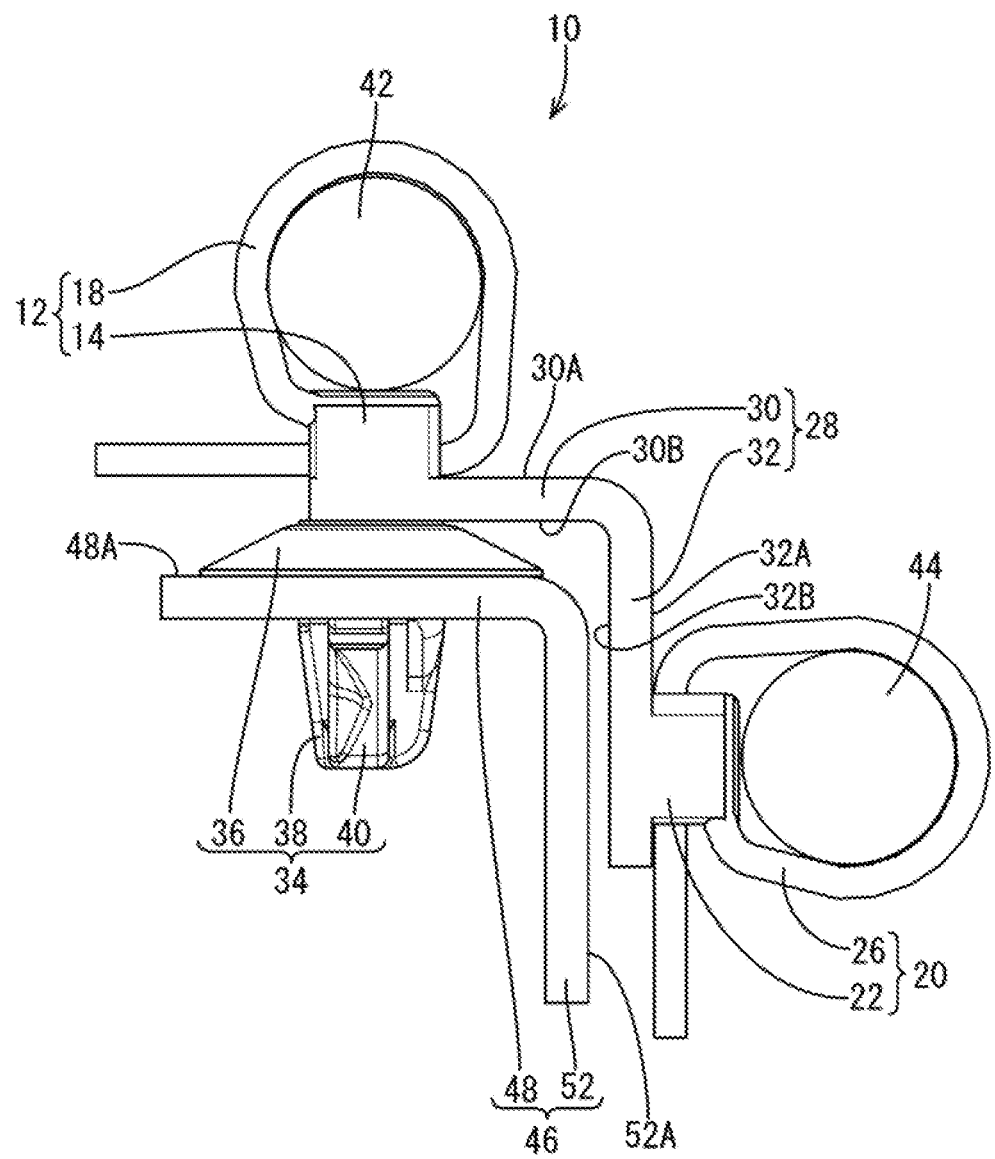
FIG. 3 is a front view of the clip after being attached to the vehicle body panel.

As shown in FIG. 1, the coupling portion 28 has an L-shaped plate shape overall in a view from the front, and is constituted by a first coupling portion 30 and a second coupling portion 32. The first coupling portion 30 has a shape that is long in the left-right direction, and its upper surface 30A and the first wire holding portion 12 are continuous. The second coupling portion 32 is provided protruding downward from the right end of the first coupling portion 30, and its right surface 32A and the second wire holding portion 20 are continuous. As shown in FIG. 3, the upper surface 30A of the first coupling portion 30 (an example of a surface that is continuous with the first wire holding portion 12) and the right surface 32A of the second coupling portion 32 (an example of a surface that is continuous with the second wire holding portion 20) are orthogonal to and intersect each other, and a lower surface 30B of the first coupling portion 30 and a left surface 32B of the second coupling portion 32 are orthogonal to and intersect each other.

As shown in FIG. 1, the first wire holding portion 12 is constituted by a first head portion 14 that is continuous with the first coupling portion 30 and a first band portion 18 that is continuous with the first head portion 14 and is flexible. The first head portion 14 has a cuboid shape and is provided protruding upward from the left end portion of the first coupling portion 30. The first head portion 14 is provided with a first insertion hole 16 that penetrates in the left-right direction, and the first band portion 18 is inserted into the first insertion hole 16 when the first wire group 42 is bundled as shown in FIG. 2. Multiple protrusions and recesses are provided on the surface of the first band portion 18, and due to the protrusions and recesses catching on lock portions (not shown) provided inside of the first insertion hole 16, the first band portion 18 is fixed so as not to fall out of the first insertion hole 16. Accordingly, the first wire group 42 can be bundled and held.

As shown in FIG. 1, the second wire holding portion 20 is constituted by a second head portion 22 that is continuous with the second coupling portion 32 and a second band portion 26 that is continuous with the second head portion 22 and is flexible. The second head portion 22 has a cuboid shape and is provided protruding rightward from the lower end portion of the second coupling portion 32. The second head portion 22 is provided with a second insertion hole 24 that penetrates in the up-down direction, and the second band portion 26 is inserted into the second insertion hole 24 when the second wire group 44 is bundled as shown in FIG. 2. Accordingly, the second wire group 44 can be bundled and held. Since the upper surface 30A of the first coupling portion 30 and the upper surface 32A of the second coupling portion 32 are orthogonal to and intersect each other, when performing a task of bundling the first wire group 42 in the first band portion 18, a finger of a worker or the first band portion 18 is prevented from interfering with the second wire holding portion 20 and the second wire group 44.

Figure 4:
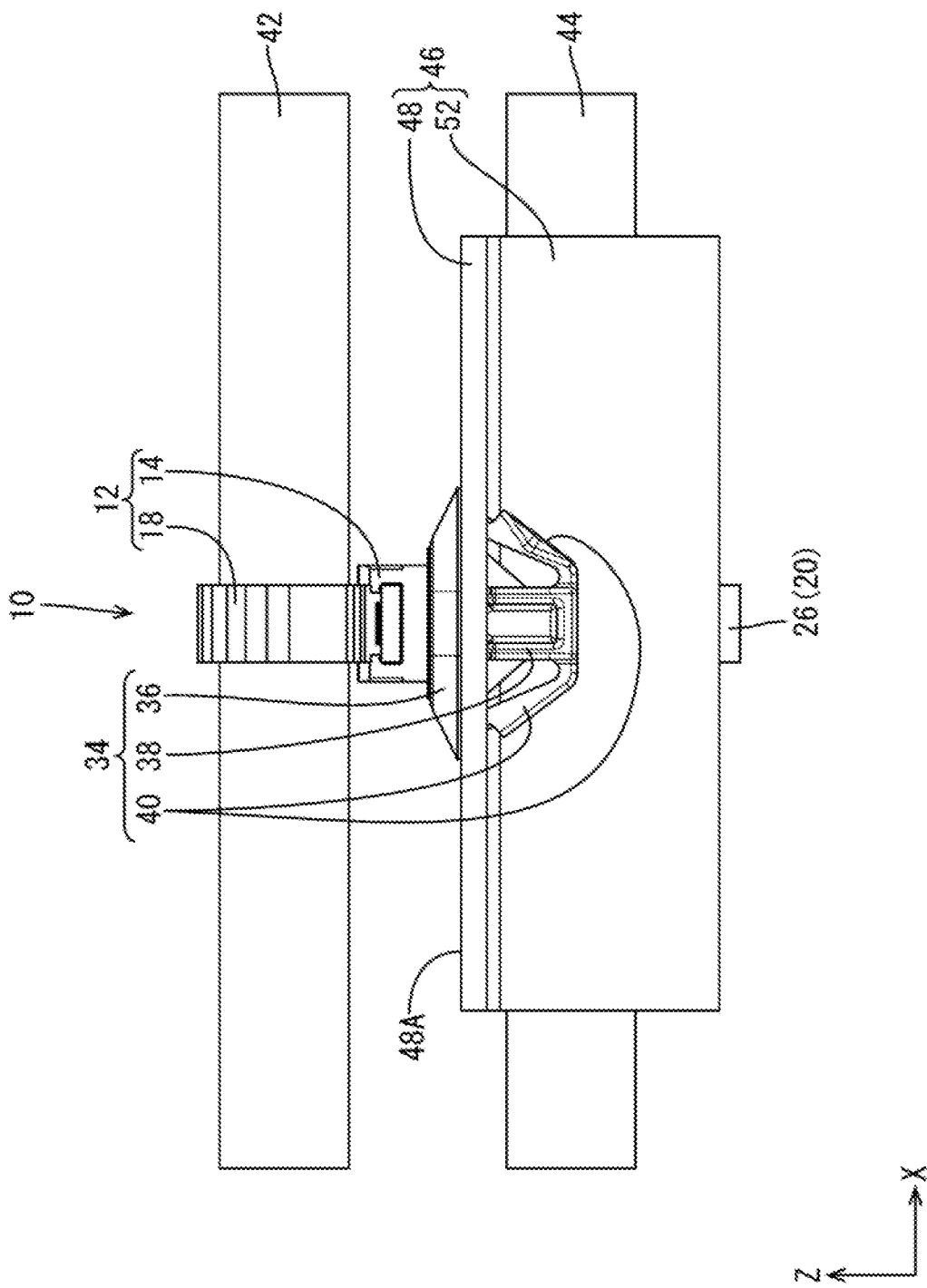
FIG. 4 is a left-side view of the clip after being attached to the vehicle body panel.

As shown in FIGS. 1, 3, and 4, the vehicle body attachment portion 34 includes: a flange portion 36 that has a circular ring shape and is continuous with the lower surface 30B of the first coupling portion 30; a column portion 38 that protrudes downward from the lower surface of the flange portion 36; and a pair of inclined piece portions 40 that protrude upward in a cantilever form from the lower end of the column portion 38. The outer shape of the flange portion 36 is set to be larger than the shape of the opening edge of the attachment hole 50. The vehicle body attachment portion 34 is located below the first wire holding portion 12, and when the vehicle body attachment portion 34 of the clip 10 is to be attached by being pressed into the attachment hole 50 of the vehicle body panel 46, the first wire holding portion 12 can be held with the hand and pressed in while a finger is brought into contact with the upper surface 30A of the first coupling portion 30. Therefore, the clip 10 is more easily attached to the vehicle body panel 46. Note that when the clip 10 is to be attached to the vehicle body panel 46, the first wire group 42 and the second wire group 44 are attached in advance in a state in which the first wire holding portion 12 and the second wire holding portion 20 are held, although this is not shown in the drawings.

When the vehicle body attachment portion 34 of the clip 10 is pressed into the attachment hole 50 of the vehicle body panel 46, the pair of inclined piece portions 40 warp inward while sliding against the opening edge of the attachment hole 50. When the vehicle body attachment portion 34 of the clip 10 is pressed into the attachment hole 50 of the vehicle body panel 46 until the flange portion 36 of the clip 10 comes into contact with the upper surface 48A of the first panel portion 48, the warping of the pair of inclined piece portions 40 returns to normal, as shown in FIG. 4. Accordingly, the clip 10 is attached to the vehicle body panel 46 with the vehicle body panel 46 sandwiched between the flange portion 36 and the pair of inclined piece portions 40.

When the clip 10 is attached to the vehicle body panel 46, as shown in FIG. 3, the lower surface 30B of the first coupling portion 30 is located parallel to the upper surface 48A of the first panel portion 48, and as shown in FIG. 2, the first wire group 42 is routed along the first panel portion 48. Similarly, the left surface 32B of the second coupling portion 32 is located parallel to the right surface 52A of the second panel portion 52, and the second wire group 44 is routed along the second panel portion 52. In this manner, the first wire group 42 and the second wire group 44 are routed along the upper surface 48A of the first panel portion 48 and the right surface 52A of the second panel portion 52, and therefore even at a location with little routing space, routing is possible. Also, the lower surface 30B of the first coupling portion 30 and the upper surface 48A of the first panel portion 48 are parallel and the left surface 32B of the second coupling portion 32 and the right surface 52A of the second panel portion 52 are parallel, and therefore it is easier to position the clip 10 on the vehicle body panel 46 and the workability of attaching the clip 10 to the vehicle body panel 46 is improved.

As shown in FIG. 3, the first wire group 42 and the second wire group 44 are routed near each other, and therefore if an attachment hole is provided in the second panel portion 52 as well, and an attempt is made to insert general clips that can fix a single wire group into the attachment hole 50 of the first panel portion 48 and the attachment hole of the second panel portion 52, then the leading ends of the general clips will interfere with each other and the two general clips can no longer be attached. However, since there is one vehicle body attachment portion 34 of the clip 10 of the present embodiment, the first wire group 42 and the second wire group 44 can be routed near each other. Also, by using the clip 10 of the present embodiment, the number of attachment holes 50 provided in the vehicle body panel 46 can be reduced.

As described above, according to the present embodiment, the first coupling portion 30 and the second coupling portion intersect each other, and therefore, for example, if the vehicle body panel 46 has two panel surfaces that intersect each other (the upper surface 48A of the first panel portion 48 and the right surface 52A of the second panel portion 52), the clip 10 can be attached to the vehicle body such that the first coupling portion 30 and the second coupling portion 32 are parallel to the panel surfaces of the vehicle body panel 46 (the upper surface 48A of the first panel portion 48 and the right surface 52A of the second panel portion 52). Accordingly, the first wire group 42 and the second wire group 44 are routed along the panel surfaces (the upper surface 48A of the first panel portion 48 and the right surface 52A of the second panel portion 52), and therefore even at a location with little routing space, the first wire group 42 and the second wire group 44 can be routed.

Also, since there is one vehicle body-side attachment hole (clip attachment portion) 50 for two wire holding portions (the first wire holding portion 12 and the second wire holding portion 20), the vehicle body-side attachment hole (clip attachment portion) 50 can be omitted.

Also, since the first coupling portion 30 and the second coupling portion 32 intersect each other, a hand is less likely to touch the second wire holding portion 20 when performing a task of holding the first wire group 42 in the first wire holding portion 12, for example, and therefore workability is increased.

Also, for example, if the vehicle body panel 46 has two panel surfaces that intersect each other (the upper surface 48A of the first panel portion 48 and the right surface 52A of the second panel portion 52), the first wire group 42 and the second wire group 44 can reliably be routed along the panel surfaces of the vehicle body panel 46 (the upper surface 48A of the first panel portion 48 and the right surface 52A of the second panel portion 52) by attaching the clip 10 to the vehicle body panel 46 such that the lower surface 30B on the side opposite to the upper surface 30A continuous with the first wire holding portion 12 of the first coupling portion 30 and the left surface 32B on the side opposite to the right surface 32A continuous with the second wire holding portion 20 of the second coupling portion 32 are parallel with the panel surfaces (the upper surface 48A of the first panel portion 48 and the right surface 52A of the second panel portion 52).

Also, the clip 10 can be attached to the two panel surfaces intersecting each other (the upper surface 48A of the first panel portion 48 and the right surface 52A of the second panel portion 52) such that the first coupling portion 30 and the second coupling portion 32 are parallel to the panel surfaces of the vehicle body panel 46 (the upper surface 48A of the first panel portion 48 and the right surface 52A of the second panel portion 52).

Also, by arranging the vehicle body attachment portion 34 as described above, for example, in the case of a structure in which the vehicle body attachment portion 34 is attached by being pressed into the attachment hole 50 of the vehicle body panel 46, the first wire holding portion 12 is held with a hand and is pressed into the attachment hole 50 of the vehicle body panel 46, and thereby the clip 10 can be attached to the vehicle body.

Also, since the first coupling portion 30 and the second coupling portion 32 intersect each other, for example, when performing a task of bundling the first wire group 42 in the first band portion 18, a finger of a worker or the first band portion 18 is prevented from interfering with the second wire holding portion 20 and the second wire group 44.

Figure 5:
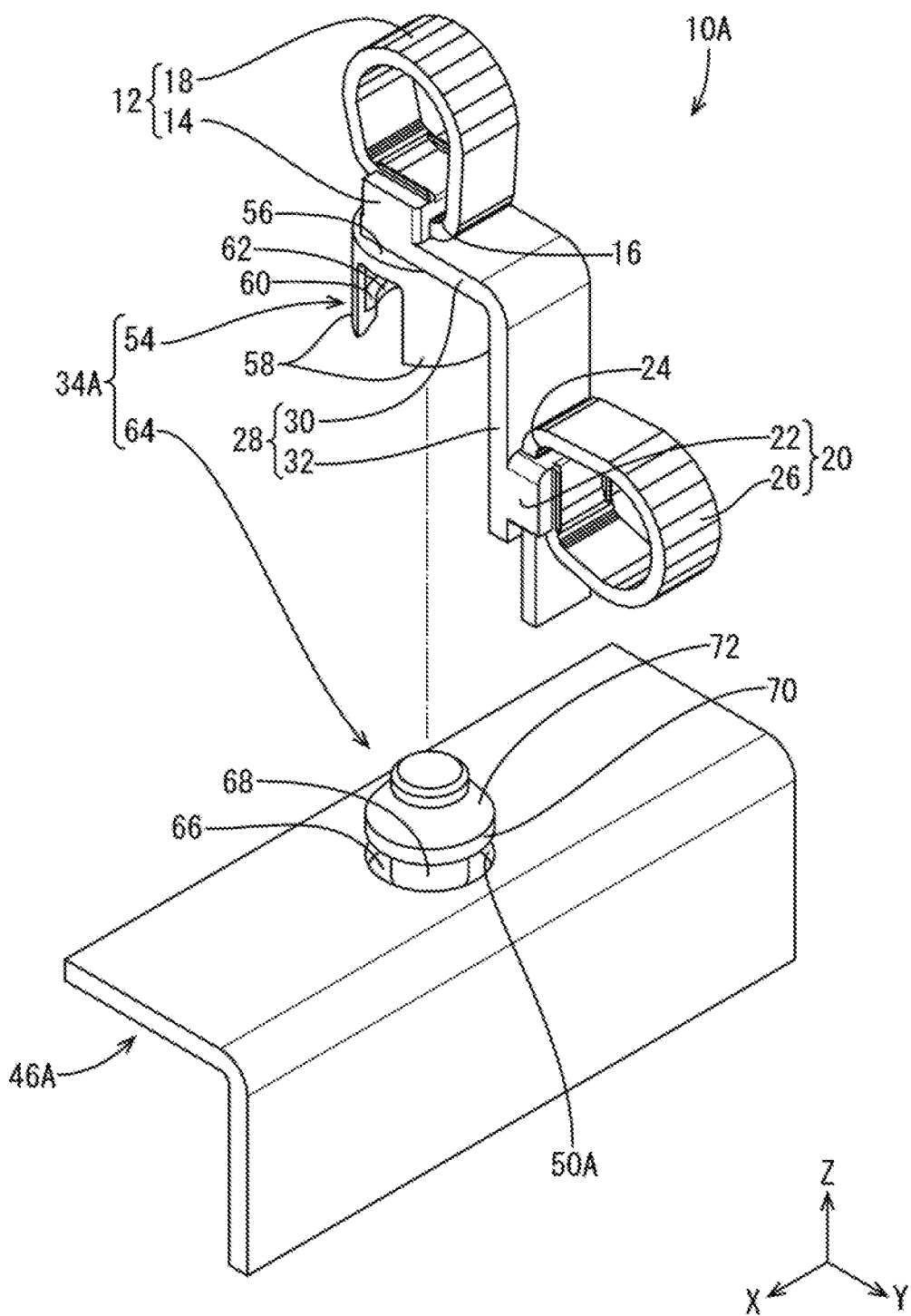
FIG. 5 is a perspective view of a clip of Embodiment 2 before being attached to a vehicle body panel.
Figure 6:
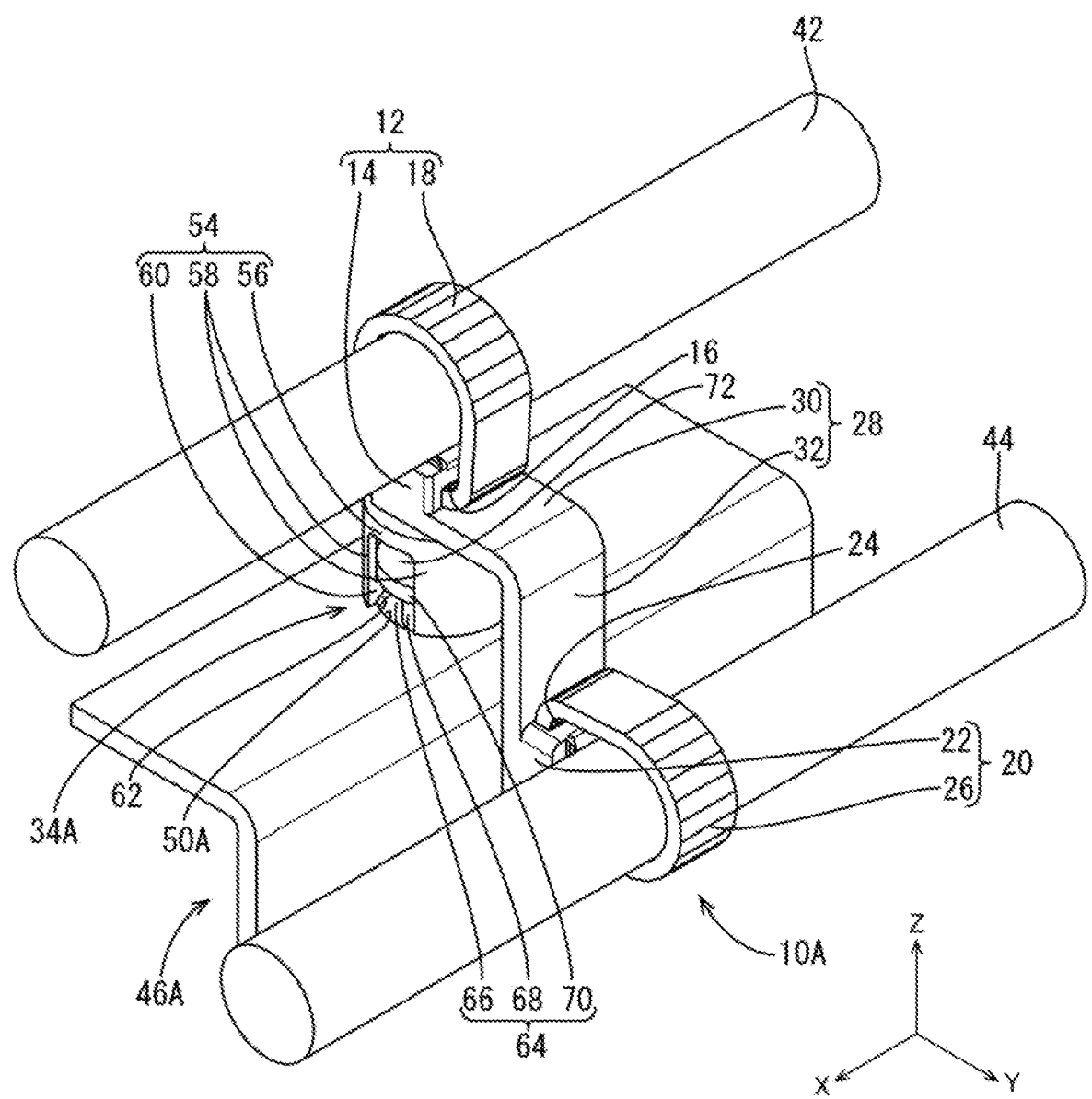
FIG. 6 is a perspective view of the clip after being attached to the vehicle body panel.

A clip 10A of Embodiment 2 will be described with reference to FIGS. 5 to 9. As shown in FIG. 5, with the clip 10A of the present embodiment, the shape of the vehicle attachment portion 34A is different from that of Embodiment 1, and the other shapes are the same as those of the clip 10 of Embodiment 1. Also, the attachment hole 52A of the vehicle body panel 46A had an elongated hole shape in Embodiment 1, whereas in the present embodiment, it has a round hole shape.

As shown in FIG. 5, the vehicle body attachment portion 34A is composed of a circular tube-shaped locking portion 54 that is continuous with the first coupling portion 30, and a lock receiving portion 64 that is separate from the locking portion 54.

Figure 7:
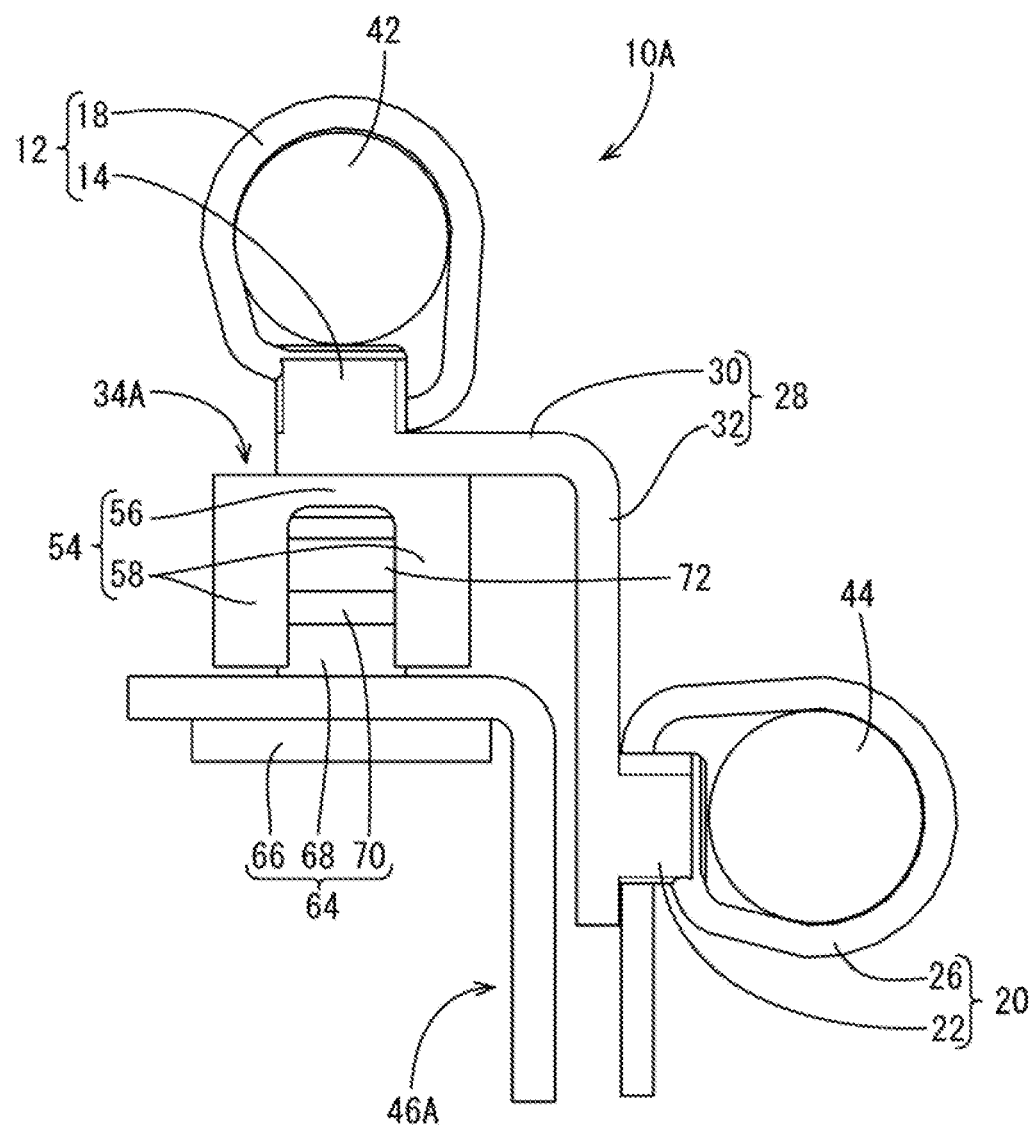
FIG. 7 is a front view of the clip after being attached to the vehicle body panel.
Figure 8:
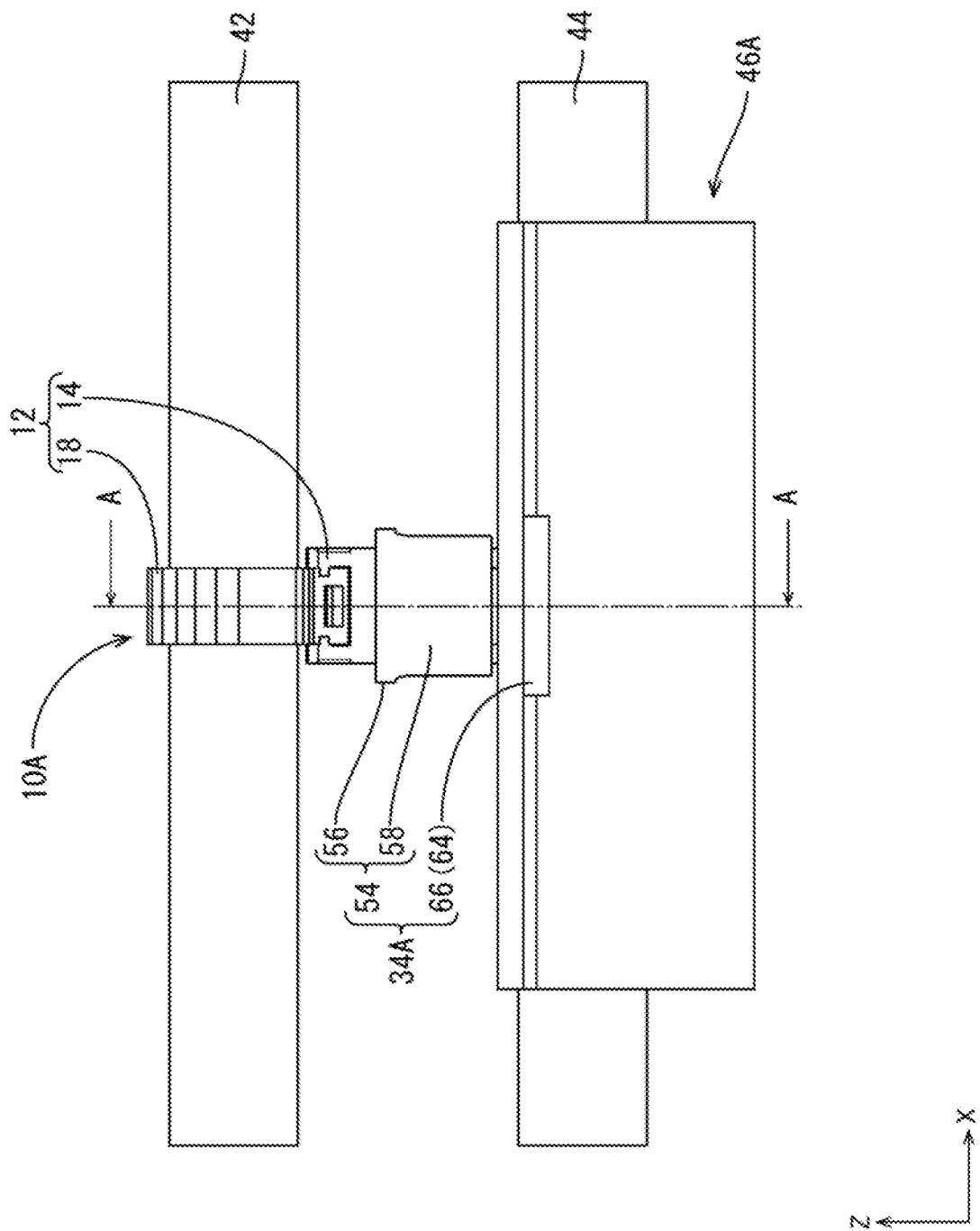
FIG. 8 is a left-side view of the clip after being attached to the vehicle body panel.
Figure 9:
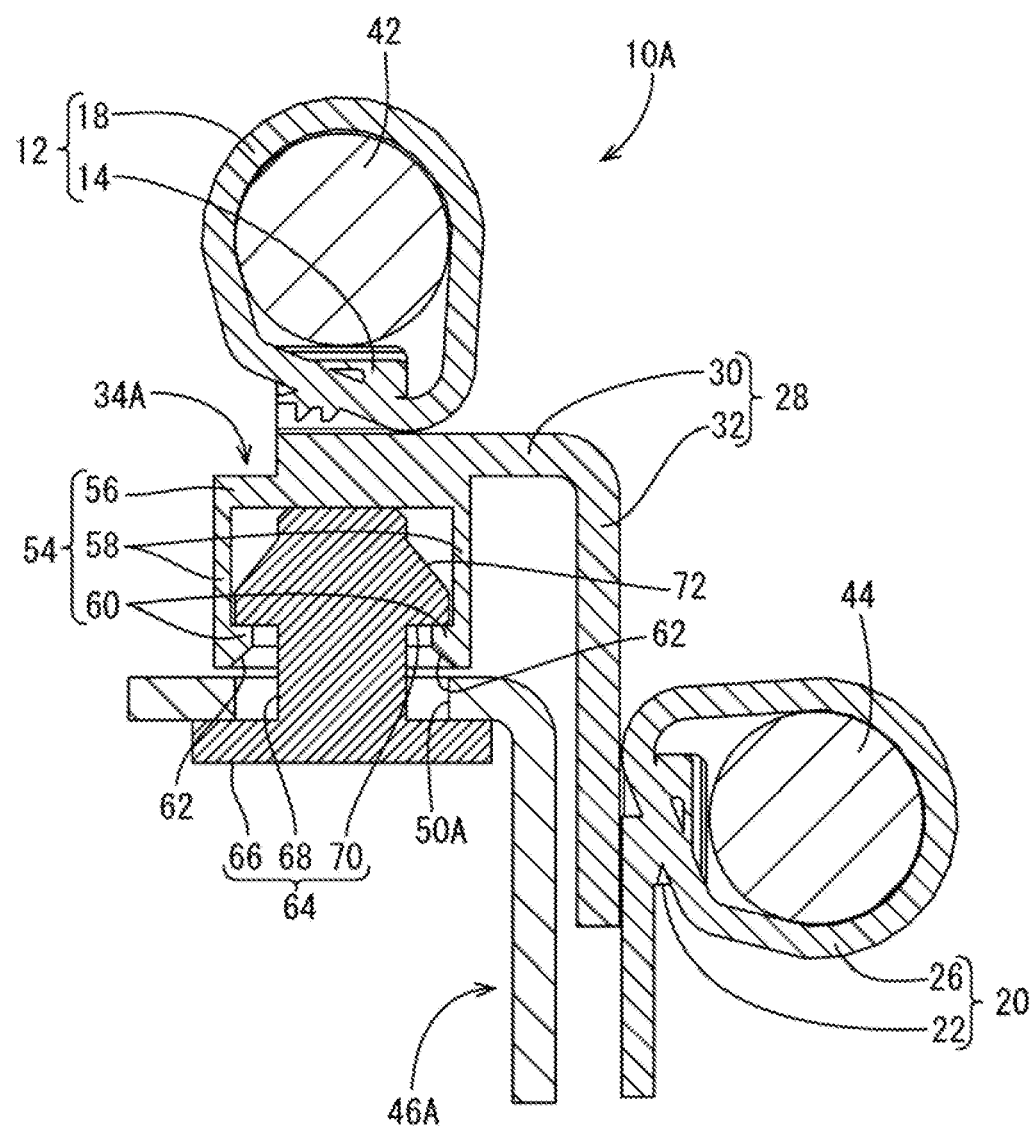
FIG. 9 is a cross-sectional view taken along line A-A in FIG. 8.

As shown in FIG. 7, the locking portion 54 includes: a circular ring-shaped locking-side base end portion 56 that is continuous with the first coupling portion 30, and a pair of warping portions 58 that protrude downward from the lower surface of the locking-side base end portion 56. As shown in FIG. 9, the lower ends of the pair of warping portions 58 are provided with a pair of locking-side lock portions 60 that protrude in mutually opposite directions. The side surfaces of the pair of locking-side lock portions 60 are provided with locking-side tapered surfaces 62 whose diameters increase toward the bottom.

As shown in FIGS. 5 and 9, the separate lock receiving portion 64 includes: a circular ring-shaped receiving-side base end portion 66; a circular column portion 68 that protrudes upward from the upper surface of the receiving-side base end portion 66; and a receiving-side lock portion 70 that is provided around the circular column portion 68. The side surface of the receiving-side lock portion 70 is provided with a receiving-side tapered surface 72 whose diameter decreases toward the top.

As shown in FIG. 9, the outer diameter of the receiving-side base end portion 66 has a diameter that is larger than the diameter of the attachment hole 50A of the vehicle body panel 46A. Also, the outer diameter of the receiving-side lock portion 70 is a diameter that is smaller than the diameter of the attachment hole 50 of the vehicle body panel 46A, and is larger than the inner diameter of the receiving-side lock portion 60.

In order to attach the clip 10A to the vehicle body panel 46A, as shown in FIG. 5, first, the circular column portion 68 of the lock receiving portion 64 is inserted into the attachment hole 50 from below the attachment hole 50A of the vehicle body panel 46A. Next, when the pair of warping portions 58 of the vehicle body attachment portion 34A are pressed into the circular column portions 68 of the lock receiving portions 64 from above, the pair of warping portions 58 warp outward while the locking-side tapered surfaces 62 of the pair of warping portions 58 slide along the receiving-side tapered surface 72 of the receiving-side lock portion 70. Furthermore, when the vehicle attachment portion 34A is pressed downward and the position of the locking-side lock portion 60 reaches a position below the receiving-side lock portion 70, the warping of the pair of warping portions 58 returns to normal and the upper surface of the locking-side lock portion 60 enters a state of being able to come into contact with the lower surface of the receiving-side lock portion 70. Accordingly, the locking portion 54 is locked to the lock receiving portion 64 and the clip 10A is attached to the vehicle body panel 46A.

As described above, according to the present embodiment, due to the locking portion 54 and the lock receiving portion 64 being locked, the clip 10A can be attached to the vehicle body.

Other Embodiments

The technique disclosed in the present specification is not limited to the embodiments described using the above description and the drawings, and for example, the following various aspects are also encompassed.

The clip 10 of the present embodiment was a band clip, but it may also be a board clip 10. In this case, it is also possible to use a structure in which the first wire holding portion and the second wire holding portion are board shapes that are longer in the front-rear direction and different wire groups are wrapped around each wire holding portion with tape.

The clip 10 of the present embodiment had a structure in which the first wire holding portion 12 and the second wire holding portion 20 are provided, but it is also possible to use a structure in which a third coupling portion is provided on the coupling portion 28, and a third wire holding portion that is continuous with the third coupling portion is provided. In this case, it is also possible to use a structure in which the third coupling portion protrudes downward from the end portion of the first coupling portion 30 on the side opposite to the second coupling portion 32.

A structure was used in which the vehicle body attachment portion 34 of the present embodiment protrudes downward from the lower surface 30B of the first coupling portion 30, but it is also possible to use a structure in which the vehicle body attachment portion 34 of the present embodiment protrudes leftward from the left surface 32B of the second coupling portion 32.

A structure was used in which the coupling portion 28 of the present embodiment is an L-shaped plate shape, but for example, it is also possible to use a structure in which the coupling portion 28 of the present embodiment has a V-shaped plate shape.

In the present embodiment, the first wire group 42 is a low-voltage wire group and the second wire group 44 is a high-voltage wire group, but this may also be reversed, both may be low-voltage wire groups, and both may be high-voltage wire groups.

The invention claimed is:

1. A clip that is to be attached to a vehicle body and is for holding a wire group, comprising:
    a coupling portion being a planar member having an L-shape so as to define a first coupling portion that is continuous with a second coupling portion, the first coupling portion orthogonal to the second coupling portion, the first coupling portion having a first wire holding portion for holding a first wire group and the second coupling portion having a second wire holding portion for holding a second wire group;
    a vehicle body attachment portion to be attached to the vehicle body, the vehicle body attachment portion disposed on a bottom surface of the first coupling portion and spaced apart from the second coupling portion.

2. The clip according to claim 1, wherein a surface of the first coupling portion that is continuous with the first wire holding portion, and a surface of the second coupling portion that is continuous with the second wire holding portion intersect each other.

3. The clip according to claim 1, wherein the vehicle body attachment portion includes: a locking portion that is continuous with the coupling portion; and a lock receiving portion that is separate from the locking portion, the lock receiving portion being a bulbous member configured to engage an opening of the vehicle body so as to be attached to the vehicle body, and is to be locked with the locking portion so as to protrude downwardly from the bottom surface of the first coupling portion.

4. The clip according to claim 1, wherein the first wire holding portion includes a first band portion for bundling and holding the first wire group, and
    the second wire holding portion includes a second band portion for bundling and holding the second wire group.

5. The clip according to claim 2, wherein the vehicle body attachment portion includes: a locking portion that is continuous with the coupling portion; and a lock receiving portion that is separate from the locking portion, the lock receiving portion being a bulbous member configured to engage an opening of the vehicle body so as to be attached to the vehicle body, and is to be locked with the locking portion so as to protrude downwardly from the bottom surface of the first coupling portion.

6. The clip according to claim 1, wherein the vehicle body attachment portion includes: a locking portion that is continuous with the coupling portion; and a lock receiving portion that is separate from the locking portion, the lock receiving portion being a bulbous member configured to engage an opening of the vehicle body so as to be attached to the vehicle body, and is to be locked with the locking portion so as to protrude downwardly from the bottom surface of the first coupling portion.

7. The clip according to claim 2, wherein the first wire holding portion includes a first band portion for bundling and holding the first wire group, and the second wire holding portion includes a second band portion for bundling and holding the second wire group.

8. The clip according to claim 3, wherein the first wire holding portion includes a first band portion for bundling and holding the first wire group, and the second wire holding portion includes a second band portion for bundling and holding the second wire group.

* * * * *